United States Patent [19]

Schumtz et al.

[11] Patent Number: 5,479,026
[45] Date of Patent: Dec. 26, 1995

[54] SYSTEM HAVING OPTICALLY ENCODED INFORMATION

[75] Inventors: Lawrence E. Schumtz, Watertown, Conn.; Craig M. Schiller, Arlington, Mass.

[73] Assignee: United Technologies Corporation, Hartford, Conn.

[21] Appl. No.: 243,637

[22] Filed: May 16, 1994

[51] Int. Cl.$^6$ ..................................................... G06K 7/10
[52] U.S. Cl. ........................... 250/568; 359/622; 235/454
[58] Field of Search .................................... 250/221, 229, 250/566, 568; 359/619, 621, 622; 235/454, 487

[56] References Cited

U.S. PATENT DOCUMENTS

| | | | |
|---|---|---|---|
| 4,867,514 | 9/1989 | Waldron | 359/619 |
| 5,270,859 | 12/1993 | Wirth et al. | 359/622 |
| 5,291,334 | 3/1994 | Wirth et al. | 359/622 |
| 5,424,533 | 6/1995 | Schmutz | 250/229 |

Primary Examiner—Stephone B. Allen
Attorney, Agent, or Firm—McCormick, Paulding & Huber

[57] ABSTRACT

A optical system having optically encoded information includes a microptic multiplet (MOM) optical system on compact arrays or cards for both secure (encrypted) and non-secure applications where the presence or position of optical micro-lenses is indicative of the encoded information. The system is characterized by a first microptic lens module (MLM) that has data optically encoded thereon based on the position of a lenslet in a lenslet cell. One or more additional microptic lens modules can be used as a key(s) to interpret the data.

17 Claims, 2 Drawing Sheets

SYSTEM HAVING OPTICALLY ENCODED INFORMATION

TECHNICAL FIELD

The field of the invention is that of optical micro-lenses, and in particular, combinations of arrays of micro-lenses that form a micro-lens module optical system in which information is optically encoded.

CROSS REFERENCE TO RELATED APPLICATIONS

Some of the subject matter hereof may be disclosed and/or claimed in the following commonly owned, applications which are incorporated herein by reference: "A Micro-Lens Panoramic Imager", U.S. Ser. No. 07/827,794, now U.S. Pat. No. 5,291,334, (Attorney Docket No. 3309-38), "An Optical Instrument With Micro-Lenses", U.S. Ser. No. 07/828,268, now U.S. Pat. No. 5,270,859, (Attorney Docket No. 3309-39) and "A METHOD AND APPARATUS FOR DEFLECTING AN OPTICAL BEAM (Attorney Docket No. 3309-45).

BACKGROUND OF THE INVENTION

Arrays of small lenses having a diameter on the order of one millimeter are referred to as micro-lenses or lenslets. Structures incorporating the same and have been made in a number of ways and used for a variety of purposes. An array of micro-lenses has been matched to an array of pixels on a television screen or other raster imaging device. Another use, such as that illustrated in "Agile Beam Steering Using Binary Optics Microlens Arrays", by W. Goltsos and M. Holz, Optical Engineering Vol. 29 No. 11, page 1392, is for steering a collimated beam of monochromatic radiation through an angle by translating one of a pair of binary micro-lens arrays that combine to form an array of Galilean telescopes. The beam is required to be monochromatic because binary micro-lenses are highly dispersive.

A variety of optical systems can be formed from select configurations of micro-optic multiplets (MOM) comprised of two or more micro-lens modules (MLM). The MLM's themselves are typically formed from planar arrays of micro-lenses. With these optical systems a single primary image is formed together with a set of images transversely displaced from an optic axis. MOM's are characterized by the property that the image distance and the object distance move in the same direction, in stark contrast to known lens systems. For example, when an object distance decreases, the corresponding image distance also decreases with the present MLM optical system.

A panoramic imaging system is formed from select configurations of micro-optic multiplets (MOM) comprised of two microlens modules (MLM). The MLM's themselves are formed from arrays of micro-lenses. These panoramic imaging systems are characterized by the two MLM's configured on concentric, approximately spherical surfaces. The optic axis of each of the micro-lenses is tilted slightly with respect to its neighbor to allow for proper alignment of images to form a single primary image on a substantially spherical global image surface.

Prior applications of micro-lenses have been limited to those in which the unique optical properties of a MLM were exploited. However, other properties have as yet gone unrecognized and unused. Typical MLM construction is characterized by a regular array of lenslets in an opaque field or in a field whose optical properties are different from those of the lenslets. As such, a MLM presents an intrinsically binary optical structure. It would be advantageous to utilize pairs of micro-lens arrays configured with a pattern of encoded binary data on a first MLM deciphered with a second MLM. The present optical system is drawn towards such an invention.

SUMMARY OF THE INVENTION

An object of the present invention is to provide for an optical system having a micro-optic multiplet (MOM) that contains optically encoded information.

Another object of the present invention is to provide a system of the forgoing type that includes a microlens module (MLM) in the form of a data card where the presence or position of optical micro-lenses is used to encode the information in scrambled form and a second microlens module (MLM) in the form of a key card is used to enable the encrypted information to be sensed by an optical detector.

Another object of the present invention is to provide an optical system of the foregoing type that employs a programmable key MLM constructed with a spatial light modulator to allow programmable patterns of occulation or lens placement.

According to the present invention, an optical system that includes a micro-optic multiplet (MOM) having encoded information comprises an array of lenslet cells for receiving a beam of radiation with each of the cells including a lenslet having a lenslet optic axis substantially parallel to a radiation optic axis. The lenslet is paired with an associated region having an optical parameter different from a lenslet optical parameter. The lenslet is also selectably located at one of two positions in the cell. There is a detector apparatus for generating electrical signal equivalents of the beam that is received through the lenslet array. The system also includes logic circuitry for receiving the detector electrical signals and generating, for each of the lenslet cells, binary electrical signals of one of two logical states indicative of which of the cell positions contains the lenslet.

According to an other aspect of the present invention, a micro-optic multiplet (MOM) optical system that has encoded information includes an array of aperture cells for receiving a beam of radiation. Each of the cells has an aperture paired with an associated region with an optical parameter different from an aperture optical parameter. The aperture is selectably located at one of two positions in the cell. There is a detector for receiving the beam and generating electrical signal equivalents thereof. A decoding apparatus includes a decoder lenslet array moveable from an aligned position receiving the beam from the aperture cell array and which provides the beam to the detector to a non-aligned position in which the presentation of the beam to the detector is disabled. There is logic circuitry for receiving the detector electrical signals and generating, for each of the lenslets, binary electrical signals of one of two logical states indicative of which cell position contains the aperture.

BRIEF DESCRIPTION OF THE DRAWINGS

FIG. 2 is a simplified illustration showing a side view of a MOM similar to that of FIG. 1.

DESCRIPTION OF THE PREFERRED EMBODIMENT

Figure 1:
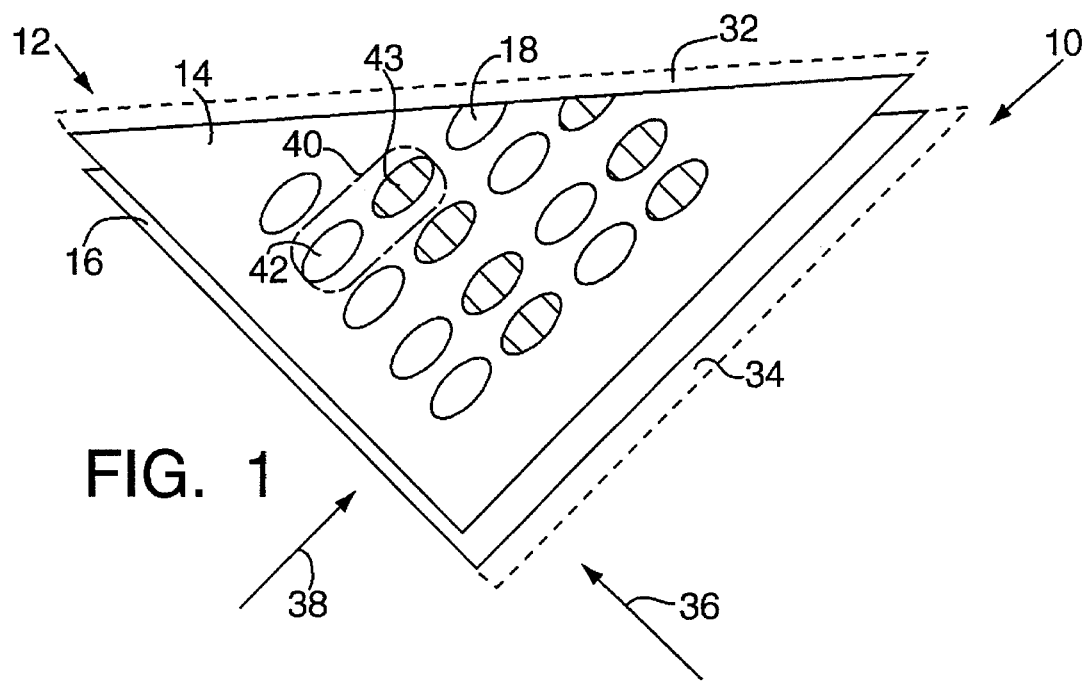
FIG. 1 is a simplified schematic illustration of a portion of an optical system provided according to the present invention having a monolithic optical multiplet (MOM) that incorporates a pair of monolithic lenslet modules (MLM).
Figure 2:
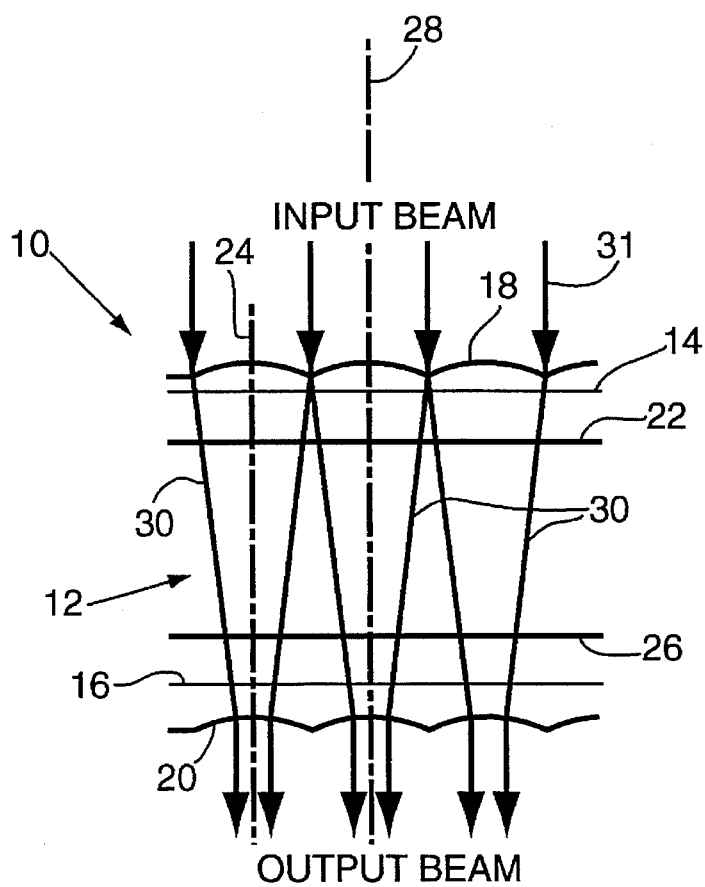
FIG. 2 is a simplified dial illustration showing diagrammatically a side view of a MOM of FIG. 1.

Referring now to FIGS. 1 and 2, there is illustrated an optical system 10 including a micro-optic multiplet 12 (MOM), which comprises a set of at least two modules 14, 16 (MLM) of micro-lenses. FIG. 1 shows a portion of the MOM 12, while FIG. 2 shows the same portion on edge. MLM 14 has an array of micro-lenses 18 of diameter $d_1$ and focal length $f_1$. MLM 16 is comprised of an array of micro-lenses 20 of diameter $d_2$ and lens focal length $f_2$. The micro-lenses are alternatively referred to as lenslets. In system 10, the diameter of the lenslets 18 and 20 are equal.

The MLM's are made from known materials such as optical epoxy, glass, silica, or zinc selenide preferably deposited on a substrate such as substrate 22, 26. The substrates are typically glass or other optically transparent material, although optically opaque or translucent substrates can be used. The lenslets are each characterized by a lenslet optic axis 24. The MLM 16 can also be deposited on an opposed surface of a substrate.

MLM 14 is spaced apart from MLM 16 by a distance M along a beam axis 28. The lenslets 20 in the embodiment of FIG. 1 are negative and each transmit a portion of a beam 30 from a corresponding one of lenslets 18. The MLM's are configured in FIG. 1 to have their optic axes in registration with a MOM axis 30, allowing the beam to be directly transmitted through the optical system without displacement or loss of optical energy, aside from Fresnel (reflection) losses.

The conditions required to form an image with MOM optical systems as well as other design considerations are detailed in the aforementioned copending U.S. patent applications. In sum, a MOM does not have an optic axis in the same sense as does a conventional lens. For purposes of forming an image, the MOM optic axis is taken to be a perpendicular drawn from the image to the MOM. For a collimated beam, the axis of the beam will be taken as the optic axis.

MOM 12 may be characterized by 5 parameters: $f_1$, $f_2$, $d_1$, $d_2$, and the spacing $h_1+h_2$. A corresponding set of global parameters: C (image distance), S (object distance), $M_t$ (transverse magnification), $S_{pn}$ (spurious image spacing), and $F_{eff}$ (effective focal length). It is apparent to those skilled in the art that there is a five-dimensional "parameter space" that permits flexibility in design.

Each MLM in the system 10 resides in a MOM plane 32, 34. The MLM's comprise a two-dimensional array of data with each lenslet column 36 equal to a data column and each lenslet row also equal to one data row 38. The lenslets are configured in lenslet cells 40 with a lenslet 42 in the first of two possible cell positions corresponding to a logical "1". The other cell position 43 is formed from the region adjacent to the lenslet and corresponds to a logical zero. A cell containing no lenslet is not "written", i.e. contains no data, while no cell can have two lenslets. In the preferred embodiment the regions outside of the lenslets are opaque, although those skilled in the art will note that other applications may be more preferable to have optically transmissive regions surrounding the lenslets.

Figure 3:
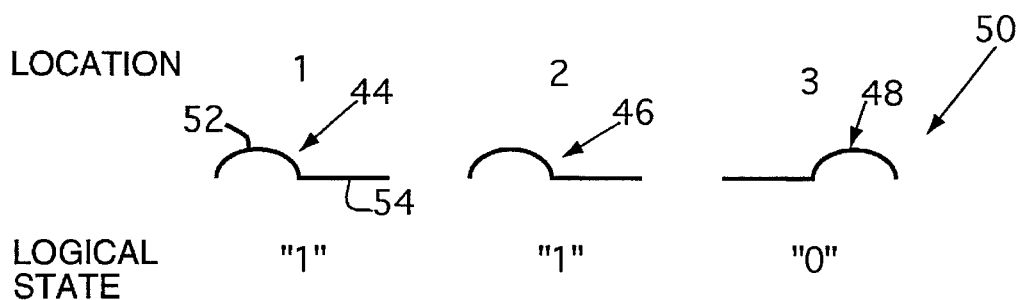
FIG. 3 is a simplified diagrammatic illustration of the MOM of FIG. 1 including detector elements.
Figure 4:
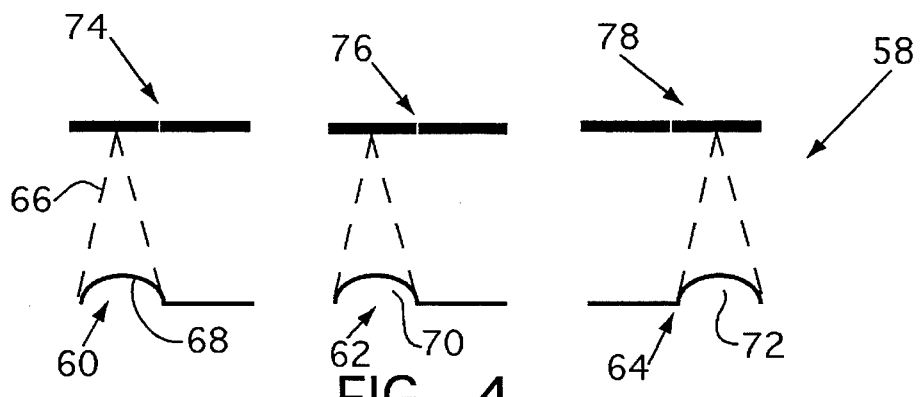
FIG. 4 is a diagrammatic illustration of the MOM of FIG. 1 showing the focal lens and ray path traversed by an illumination beam.

FIG. 3 diagrammatically illustrates a linear position of cells 44–48 in an MLM 50. Cell 44 is comprised of two adjacent positions 52, 54 at which the cell lenslet may reside. When the lenslet is located in the left-most position, it corresponds to a logical one while when located in the right-most position it corresponds to a logical zero. FIG. 4 illustrates a portion of an optical system 56 provided in accordance with the present invention. A simple linear array 58 of lenslet cells 60–64 has two positions per cell, as above. A radiation beam 66 passes through the cells via lenslets 68–72. There is a pair of detectors 74–78 associated with each cell which generate electrical signal equivalents of the beam. A signal generated by a leftmost detector is interpreted by external logic circuitry as a logical one. Should the lenslet be in the right position in a cell and provide light to the corresponding right detector in the detector pair, a logical "0" signal is generated.

Figure 5:
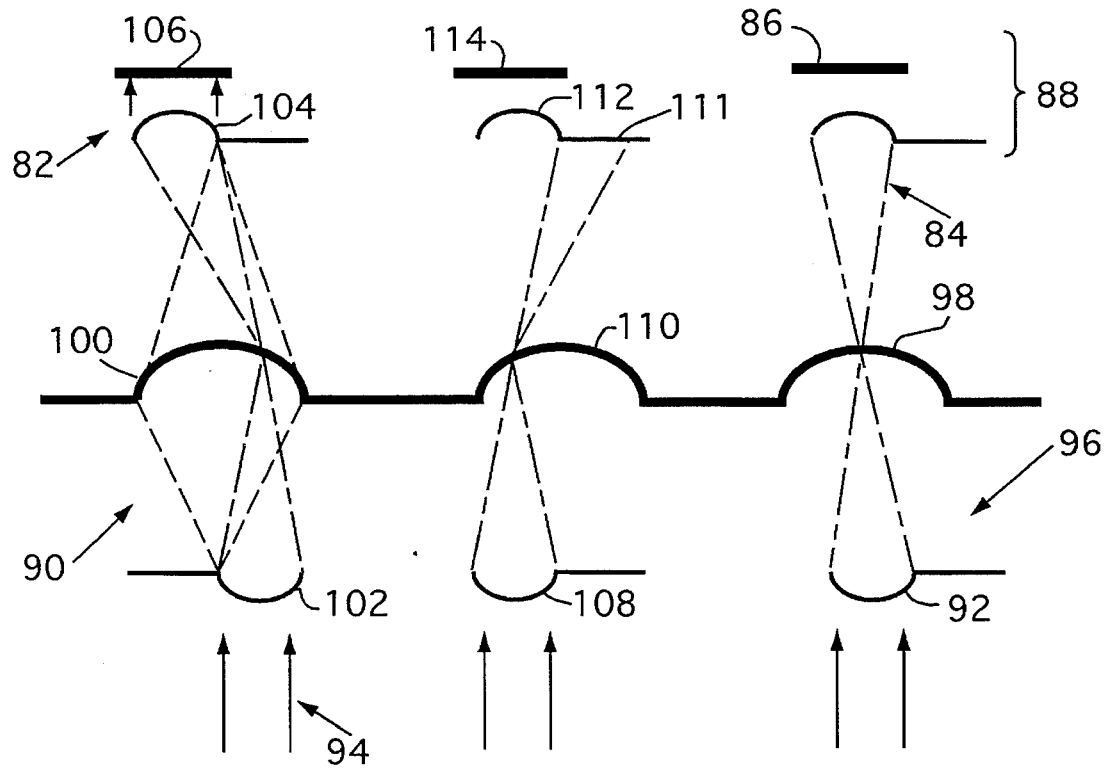
FIG. 5 is a simplified schematic illustration of optical system provided according to the present invention showing the focal lengths of lenslets and ray paths traversed by a beam of radiation.

Illustrated in FIG. 5 is an alternative optical system 80 including an optical "key" that must be inserted to allow for a proper interpretation of the stored data. MLM 82 is comprised a plurality of lenslets 84. Spaced in registration with the lenslets are corresponding detectors 86. In the embodiment of FIG. 5, the MLM 82 and detectors constitute a reader assembly 88 in the form of a card. The system also includes a MLM 90 that has a plurality of data lenslet cells 92, each of which is coded using the binary lenslet positional scheme detailed above. MLM 90 can be in the form of a data card.

In operation, an illumination beam 94 is presented through the data lenslets towards the detectors. However, in order for the system to function, a "key" MLM 96, also in the form of a card, must be inserted in the optical path of the beam. The key MLM includes a plurality of lenslets 98 sized and spaced such that when inserted, the illumination beam is deflected to a reader lenslet, enabling detection. Therefore, the key lenslet needs to be inserted to "unlock" the system to enable operation.

In the optical system 80, the data MLM lenslets are of a diameter D and are in one of two binary positions within that lenslet's cell. The key MLM is placed between the data and reader MLM's and contains key lenslets, each having a focal length which images light from a data lenslet onto a corresponding reader in the assembly field. The key lenslets are 2 D in diameter and are in one of two nominal locations differing by D/2. The focal length of the key lenslets is selected to image the received beam in the plane containing the reader MLM lenslets.

The key lenslets act as logical inverters which either invert the data or not depending upon which position each key lenslet occupies. Therefore the value received in each reader field depends on the combination of the data and key lenslet optical parameter values. For example, key lenslet 100 receives a portion of the beam from data lenslet 102 and provides the same to reader lenslet 104 before presentation to detector 106. Signals from detector 106 are processed as a logical "1". In contrast, the beam received from data lenslet 108 by key lenslet 110 is presented to a region 111 adjacent reader lenslet 112. Consequently, the logic circuitry will interpret this situation as a Logical "0" since no signals was received from detector 114. This is true even though the lenslet position in cell 116 corresponds to a logical "1".

Table 1 below presents the corresponding binary output signals generated for a two lenslet array.

|  |  | DATA | |
|---|---|---|---|
|  |  | 0 | 1 |
| KEY | 0 | 0 | 1 |
|  | 1 | 1 | 0 | output |

For any desired output signal state there are two equivalent input signals, therefore by taking the desired data and randomly selecting data and key value lenslet pairs to represent it, neither data nor key cards could be read independently, since each would contain only a random binary sequence. Note that the embodiment of FIG. 5 can be readily extended with key lenslet positions allowed to move in two dimensions rather than the single dimension illustrated in the Figure. Moreover, two independent key cards could be required to decode a single data card and neither card alone could yield any information. The data MLM need not be a lenslet array. The data could easily be holes punched into a thin, substantially opaque card in the appropriate locations.

Although disclosed in the preferred embodiment to comprise a rectilinear grid of lenslets, those skilled in the art will note that alternative geometric configurations are possible, as are other combinations of encoded data MLMs with additional key MLMs and detector arrays. Alternatively, the lenslets may be fabricated for an individual MOM in a matter to induce a uniaxial or alternatively an angular displacement of the input optical beam by a corresponding uniaxial or angular displacement of the output lenslet optic axis with respect to an input lenslet optic axis.

Similarly, although the invention has been shown and described with respect to a preferred embodiment thereof, it should be understood by those skilled in the art that various other changes, omissions and additions thereto may be made therein without departing from the spirit and scope of the pre-sent invention

We claim:

1. A micro-optic multiplet (MOM) optical system having encrypted information, said system comprising:

an array of lenslet cells for receiving a beam of radiation, each of said cells including a lenslet having a lenslet optic axis substantially parallel to a radiation optic axis paired with an associated region having an optical parameter different from a lenslet optical parameter, said lenslet being selectably located at one of two positions in said cell;

a detector means for generating electrical signal equivalents of said beam received through said lenslet array; and logic circuitry for receiving said detector means electrical signals and generating, for each of said lenslet cells, binary electrical signals of one of two logical states indicative of which of said cell positions contains said lenslets, thereby providing the encrypted information.

2. The system of claim 1 wherein said lenslet cell associated position is opaque.

3. The system of claim 1 wherein said detector means further comprises a plurality of first and second detectors positioned in registration with an associated one of lenslet cells and wherein said lenslets focus said radiation on to a one of said first and second detectors in dependence on lenslet position within said cell.

4. The system of claim 1 wherein said logic circuitry further comprises substraction circuits for comparing electrical signals provided through said lenslet cells and generating output signals in dependence on the cell position receiving said beam.

5. A micro-optic multiplet (MOM) optical system having encrypted information, said system comprising:

an array of aperture cells for receiving a beam of radiation, each of said cells having an aperture paired with an associated region having an optical parameter different from an aperture optical parameter, said aperture being selectably located at one of two positions in said cell;

a detector means for receiving said beam and generating electrical signal equivalents;

a decoding means including a decoder lenslet array moveable from an aligned position receiving said beam from said aperture cell array and providing said beam to said detector means to a non-aligned position disabling the presentation of said beam to said detector means;

logic circuitry for receiving said detector means electrical signals and generating, for each of said lenslets, binary electrical signals of one of two logical states indicative of which cell position contains said aperture, thereby providing the encrypted information.

6. The system of claim 5 wherein each of said apertures contains a lenslet having an aperture lenslet optic axis substantially parallel to a radiation optic axis.

7. The system of claim 5 further comprising a reader lenslet array positioned to receive said beam from said decoding means and wherein said detector means further comprises a detector array having each of said detectors located in substantial registration with a corresponding reader lenslet, said reader lenslets for focusing said beam onto said detectors.

8. The system of claim 7 wherein said decoder lenslets have a decoder lenslet optic axis substantially parallel to said radiation optic axis configured to receive said beam from corresponding aperture cells, said decoder lenslets having a diameter approximately coextensive with the dimension of said aperture cells and twice the diameter of said reader lenslets.

9. The system of claim 6 wherein said decoder and reader lenslet optical parameters include focal lengths are selected to image said beam onto said detectors.

10. The system of claim 5 wherein said decoder means futher comprises an array of decoder cells for receiving said beam, each of said cells having a one of said lenslets paired with an associated region having an optical parameter different from an lenslet optical parameter, said lenslet being selectably located at one of two positions in said cell.

11. The system of claim 5 wherein said detector means further comprises an detector array having elements including first and second detectors positioned in registration with an associated one of lenslet cells and wherein said lenslets focus said radiation on to a one of said first and second detectors in dependence on lenslet position within said cell.

12. The optical system according to claim 5, in which said aperture array and said decoder lenslet array are separated by an axial distance substantially equal to the sum of said first and second focal lengths 13. The optical system of claim 5 further comprising a cylindrical MOM assembly having first and second MLM's configured on a surface of a cylinder adapted to receive said radiation beam from a mirror positioned along a rotational axis.

14. The optical system of claim 5 further comprising an annular MOM assembly having first and second MLM's configured in adjacent sectors of a substantially planar annulus .

15. The optical system of claim 7 further comprising an optically transparent substrate for receiving said aperture lenslet array on a first outer surface and said reader lenslet array on an opposed second outer surface.

16. The optical system of claim 7 wherein said substrates have a thickness chosen in dependence on the desired optical system focal length.

17. The optical system of claim 7 wherein said decoding means further comprises a second decoder lenslet array moveable from an aligned position receiving said beam from said first decoder lenslet array and providing said beam to said reader lenslet array.

* * * * *

UNITED STATES PATENT AND TRADEMARK OFFICE
CERTIFICATE OF CORRECTION

PATENT NO. : 5,479,026
DATED : December 26, 1995
INVENTOR(S) : Lawrence Schmutz and Craig Schiller It is certified that error appears in the above-indentified patent and that said Letters Patent is hereby corrected as shown below:

```
Title Page, Item [75] Inventors:  line 1 delete "Schumtz"
and insert --Schmutz--;  line 2, delete "Conn." and
insert --Mass.--
```

Signed and Sealed this

Thirteenth Day of August, 1996

Attest:

BRUCE LEHMAN

*Attesting Officer*     *Commissioner of Patents and Trademarks*